US008032285B2

(12) United States Patent
Li

(10) Patent No.: US 8,032,285 B2
(45) Date of Patent: Oct. 4, 2011

(54) DEVICE WITH MEMORY FUNCTION FOR CONTROLLING CLOSURE OF VEHICLE AND METHOD THEREOF

(75) Inventor: Shih-Hsiung Li, Taipei (TW)

(73) Assignee: Shih-Hsiung Li, Taipei (TW)

( * ) Notice: Subject to any disclaimer, the term of this patent is extended or adjusted under 35 U.S.C. 154(b) by 975 days.

(21) Appl. No.: 11/948,776

(22) Filed: Nov. 30, 2007

(65) Prior Publication Data

US 2009/0139142 A1 Jun. 4, 2009

(51) Int. Cl.
*G06F 7/00* (2006.01)

(52) U.S. Cl. ................................ 701/49; 340/438; 49/26

(58) Field of Classification Search ......................... None
See application file for complete search history.

(56) References Cited

U.S. PATENT DOCUMENTS

| | | | | |
|---|---|---|---|---|
| 4,029,176 | A | 6/1977 | Mills | |
| 6,753,777 | B2 | 6/2004 | Li | |
| 6,925,755 | B1 * | 8/2005 | Kyrtsos | 49/26 |
| 7,490,841 | B2 * | 2/2009 | Castello et al. | 280/274 |
| 2001/0042820 | A1 | 11/2001 | Wilson | |
| 2002/0036259 | A1 | 3/2002 | Agam et al. | |
| 2004/0095240 | A1 | 5/2004 | Li | |

FOREIGN PATENT DOCUMENTS

| | | | | |
|---|---|---|---|---|
| DE | 101 00 137 | A1 | | 8/2001 |
| EP | 1243943 | | | 9/2002 |
| JP | 6136481 | | | 2/1986 |
| JP | 347114 | | | 10/1991 |
| JP | 04-362462 | | * | 12/1992 |
| JP | 6121284 | | | 4/1994 |
| JP | 8-331877 | A | | 12/1996 |
| JP | 11-22295 | A | | 1/1999 |
| JP | 2002-106255 | A | | 4/2002 |
| JP | 2003-278443 | A | | 10/2003 |
| WO | 02/44505 | A1 | | 6/2002 |

OTHER PUBLICATIONS

German Office Action issued Oct. 19, 2004 in connection with file No. 10 2004 018 584.0-23.
Japanese Office Action issued on Jun. 12, 2007 in connection with file No. 2004-129544.
Search Report issued from United Kingdom Intellectual Property Office on Feb. 28, 2008 for Application No. GB0723360.4.

* cited by examiner

*Primary Examiner* — Michael J. Zanelli
(74) *Attorney, Agent, or Firm* — Eschweiler & Associates, LLC

(57) ABSTRACT

A device with a memory function for detecting closure of vehicle doors and the method thereof is disclosed. Before a vehicle door is open, a detecting signal near the outer side of the door is emitted and its detection status is recorded. When the vehicle door is to be closed, a first detecting signal is emitted from the door frame top downwards and a second detecting signal is emitted near the outer side of the door. If the first detecting signal indicates that a person is at the door or the second detecting signal indicates that a person exists on the outer side of the door by comparison with a precious record, then the door is prohibited from being closed. Otherwise, the door can be closed. This automatic detection method can prevent the driver from accidentally hurt passengers by carelessly closing the doors.

16 Claims, 9 Drawing Sheets

DEVICE WITH MEMORY FUNCTION FOR CONTROLLING CLOSURE OF VEHICLE AND METHOD THEREOF

BACKGROUND OF THE INVENTION

1. Field of the Invention

The invention relates to a device with a memory function for controlling the closure of vehicle doors. In particular, the invention pertains to a device that is disposed around a vehicle door for detection, so that passengers can be prevented from being accidentally hurt by closing doors. The method thereof is also disclosed.

2. Description of Related Art

In mass transportation, it often happens that passengers are hurt by closing doors. For example, a bus usually has a front door and a rear door. The open, and close of the doors are controlled by the driver. To prevent the doors from hurting people or objects as they close, the driver has to check whether any person or object is in the vicinity of the door area through a rear mirror inside the vehicle or a side minor outside the vehicle. If there are many people inside the bus the driver's vision may be blocked so that the door is closed at the wrong timing to hurt passengers. This is particularly so for the rear door. If passengers are still getting on and off the bus, they may be hurt by the closing door. Such accidents happen all the time.

One solution is to install a camera near the door and a small monitor by the driver. However, this method requires the use of monitor and camera that involve a higher cost. Moreover, the camera may capture inappropriate images of ladies in summer time. Therefore, it is not widely used.

Another solution is to install a sensor on the door (similar to the elevator). If some person or object is squeezed by the door as it closes, the door automatically opens. However, if the pinched is a soft object such as a backpack belt, a scarf, or the edge of a skirt, then the above-mentioned sensor may not be able to detect it. Therefore, this is unsafe to people getting off the vehicle. For example, the passenger may be pulled by the vehicle because his/her backpack belt is held by the door.

A third solution is to install infrared (IR) or ultrasonic wave sensors above the door. When a person stands at the door, it notifies the driver not to close the door. Nevertheless, if the bus is crowded with people, the IR or ultrasonic wave sensor may incorrectly detect people or objects in the vicinity of the door, resulting erroneous reports.

SUMMARY OF THE INVENTION

In view of erroneous reports in existing devices for detecting the door closure, an objective of the invention is to provide a method for monitoring the closure of vehicle doors with a memory function. By storing the empty situation outside the vehicle door in advance, the method can detect and determine whether any person is right outside the door by direct comparison. This can reduce the possibility of incorrect judgments of the driver.

To achieve the above objective, the disclosed method includes the steps of:

emitting a first detecting signal when the door opens for detecting and recording the environmental status outside the door;

emitting a second detecting signal when the door is to be closed for detecting whether any obstacle exists at the place directly under the door frame top, and allowing the door to close if the second detecting signal detects no obstacle or forbidding the door to close if an obstacle is detected;

emitting a third detecting signal for detecting and recording the environmental status outside the door when the second detecting signal indicates that the vehicle door is allowed to be closed; and comparing the environmental status outside the door as detected by the first detecting signal with the environmental status outside the door as detected by the third detecting signal, and forbidding the door to close if they are obviously different.

Another objective of the invention is to provide a device with a memory function for monitoring the closure of vehicle doors. The device includes:

a first ultrasonic wave sensor installed at the top of a door frame for detecting the place under the top of the door frame;

a second ultrasonic wave sensor for detecting the nearby area outside the door;

a microprocessor built in with an internal memory;

a signal transceiving unit connected with the microprocessor for controlling the first and second ultrasonic wave sensors to emit ultrasonic probing signals and receiving the reflected signals;

a return wave amplifying unit connected between the signal transceiving unit and the microprocessor for amplifying the return wave signals received by the signal transceiving unit and sending the amplified signals to the microprocessor for processing; and a vehicle door closure determining and controlling circuit connected with the microprocessor for detecting whether the door is open or closed and outputting a corresponding signal to the microprocessor, thereby determining the open and close of the door through the control of the microprocessor.

The first ultrasonic wave sensor is controlled by the microprocessor. When the door is open, it emits a first detecting signal for detecting and recording the environmental status outside the door. When the door is to be closed, the second ultrasonic wave sensor emits a second detecting signal for detecting the existence of any person underneath the door frame top. When the second detecting signal indicates that the vehicle door is allowed to be closed, the first ultrasonic wave sensor emits a third detecting signal for detecting and recording the environmental status outside the door. The microprocessor compares the environmental status outside the door as detected by the first detecting signal with the environmental status outside the door as detected by the third detecting signal. If they are obviously different, the door is forbidden from being closed.

DETAILED DESCRIPTION OF THE PREFERRED EMBODIMENT

Figure 1:
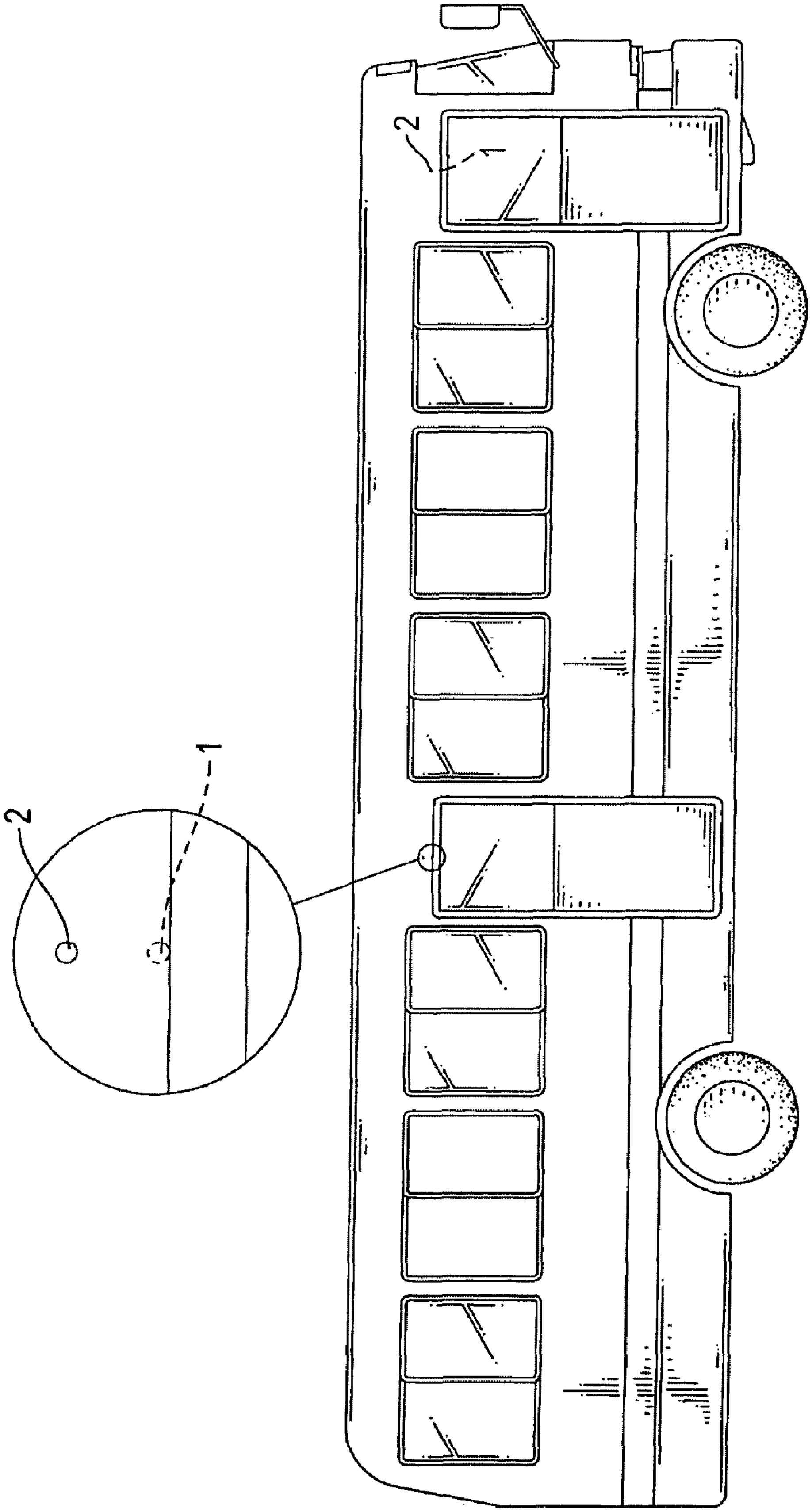
FIG. 1 is a schematic view of the invention.
Figure 2:
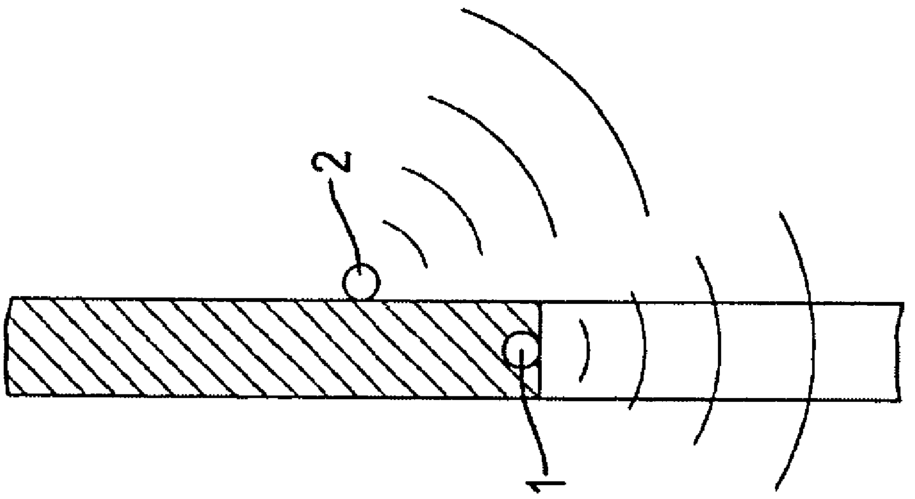
FIG. 2 is another schematic view of the invention.
Figure 3:
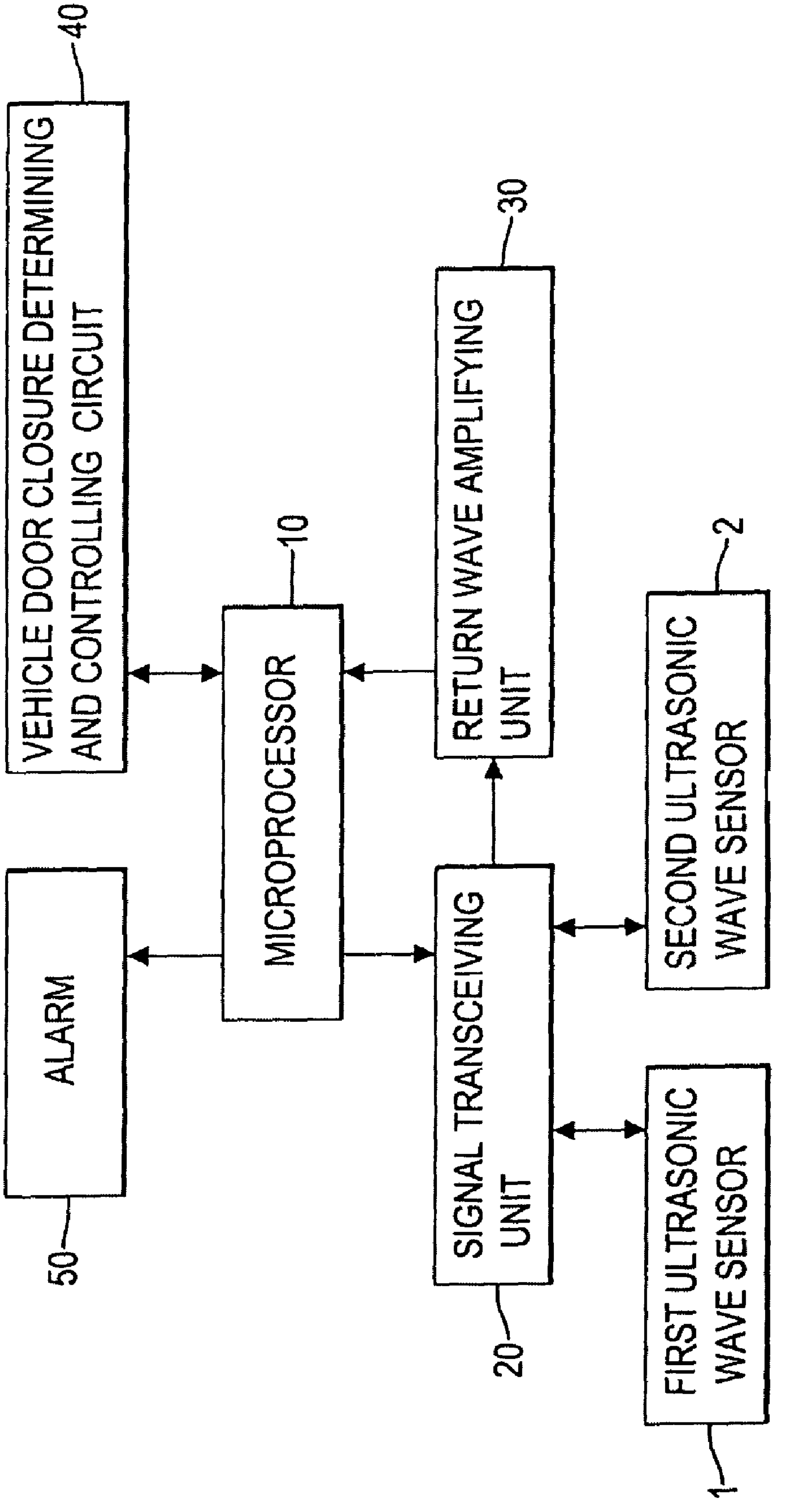
FIG. 3 is a block diagram of the invention.
Figure 4A:
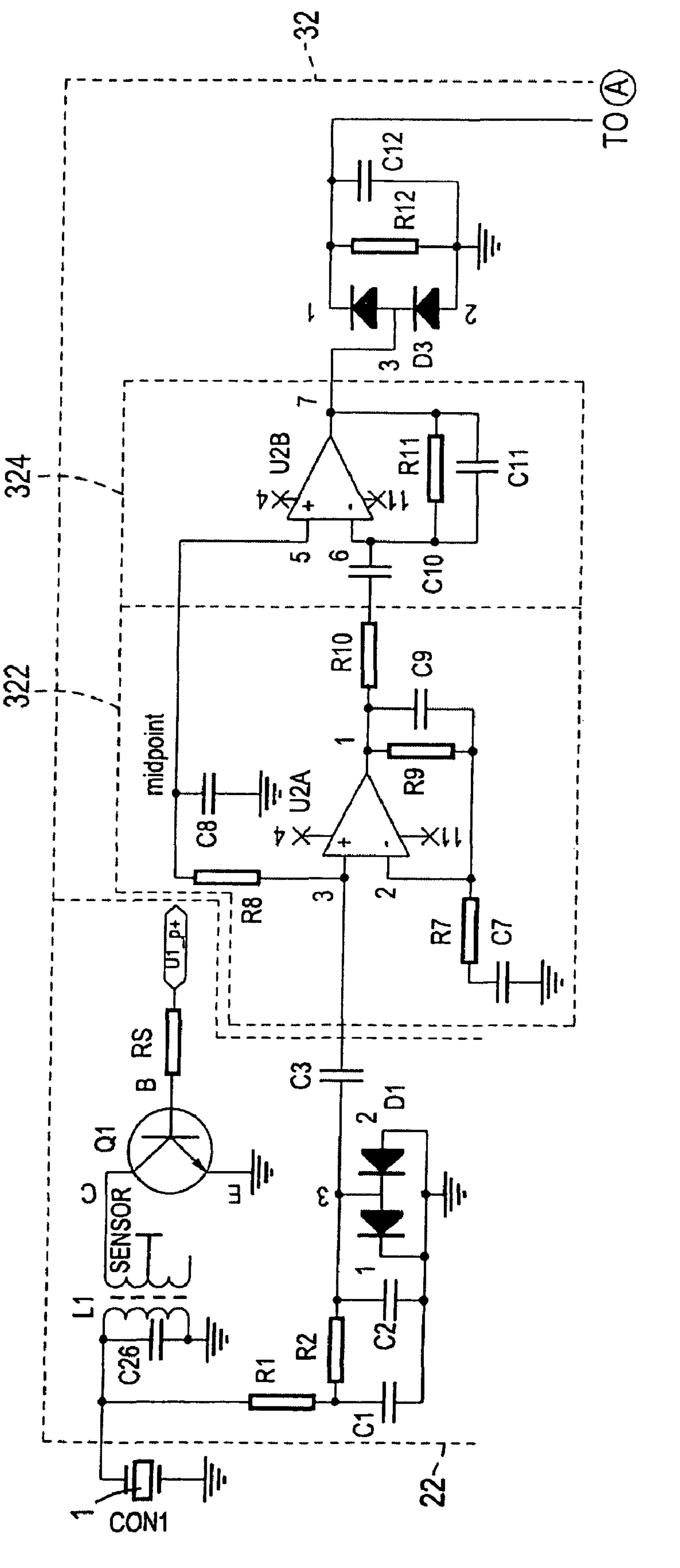
FIGS. 4A-4E show a detailed view of a portion of the circuit.
Figure 4B:
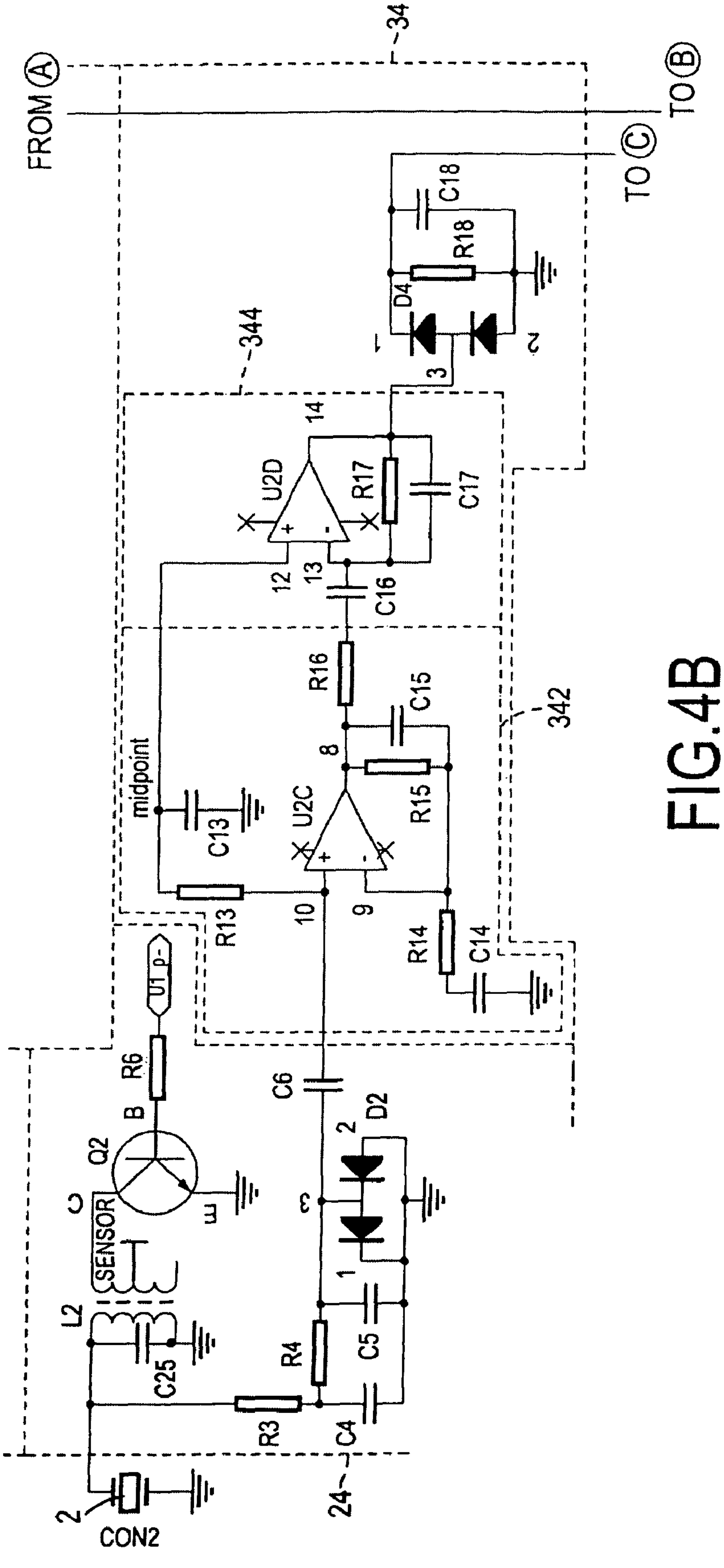
Figure 4C:
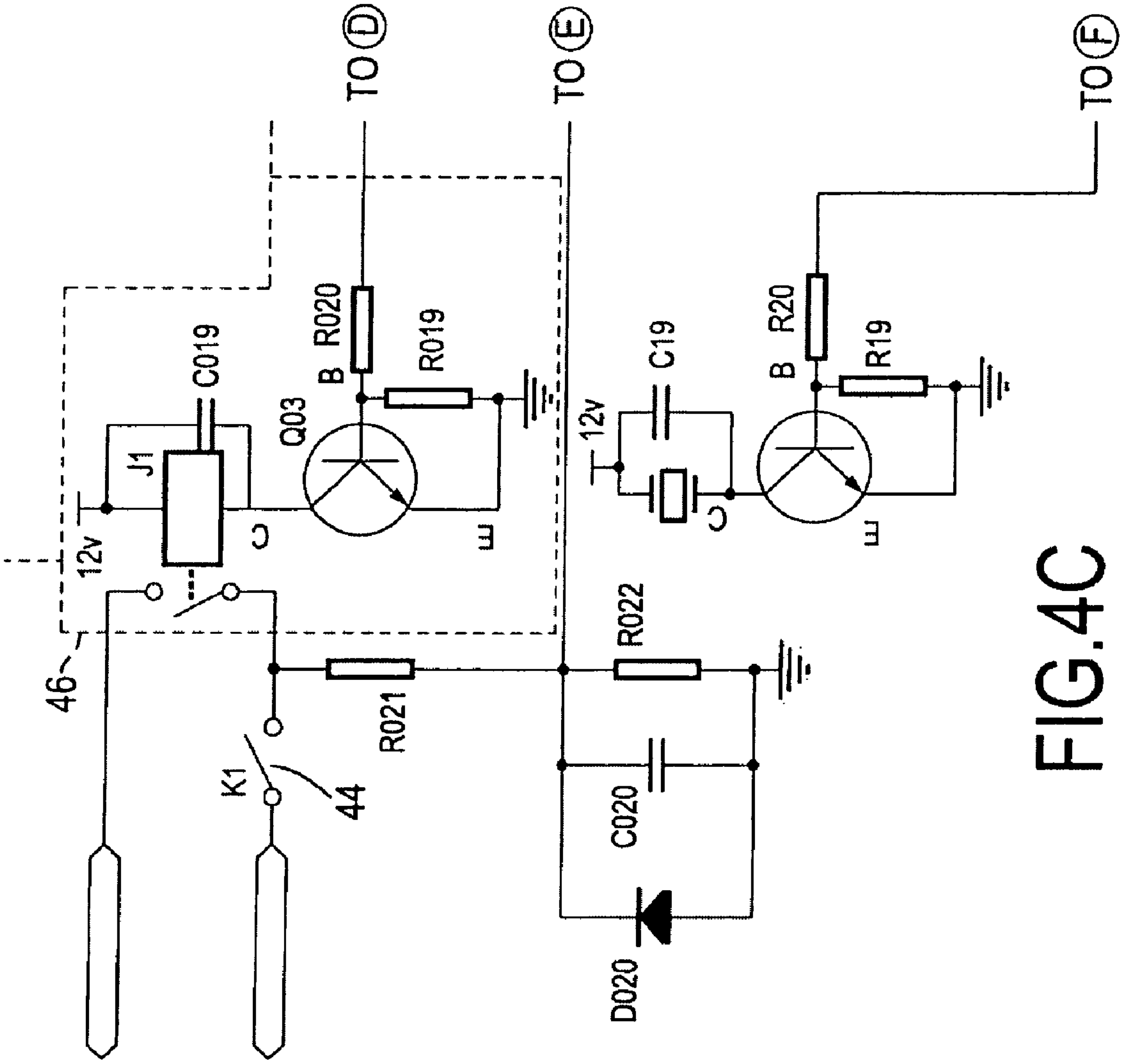
Figure 4D:
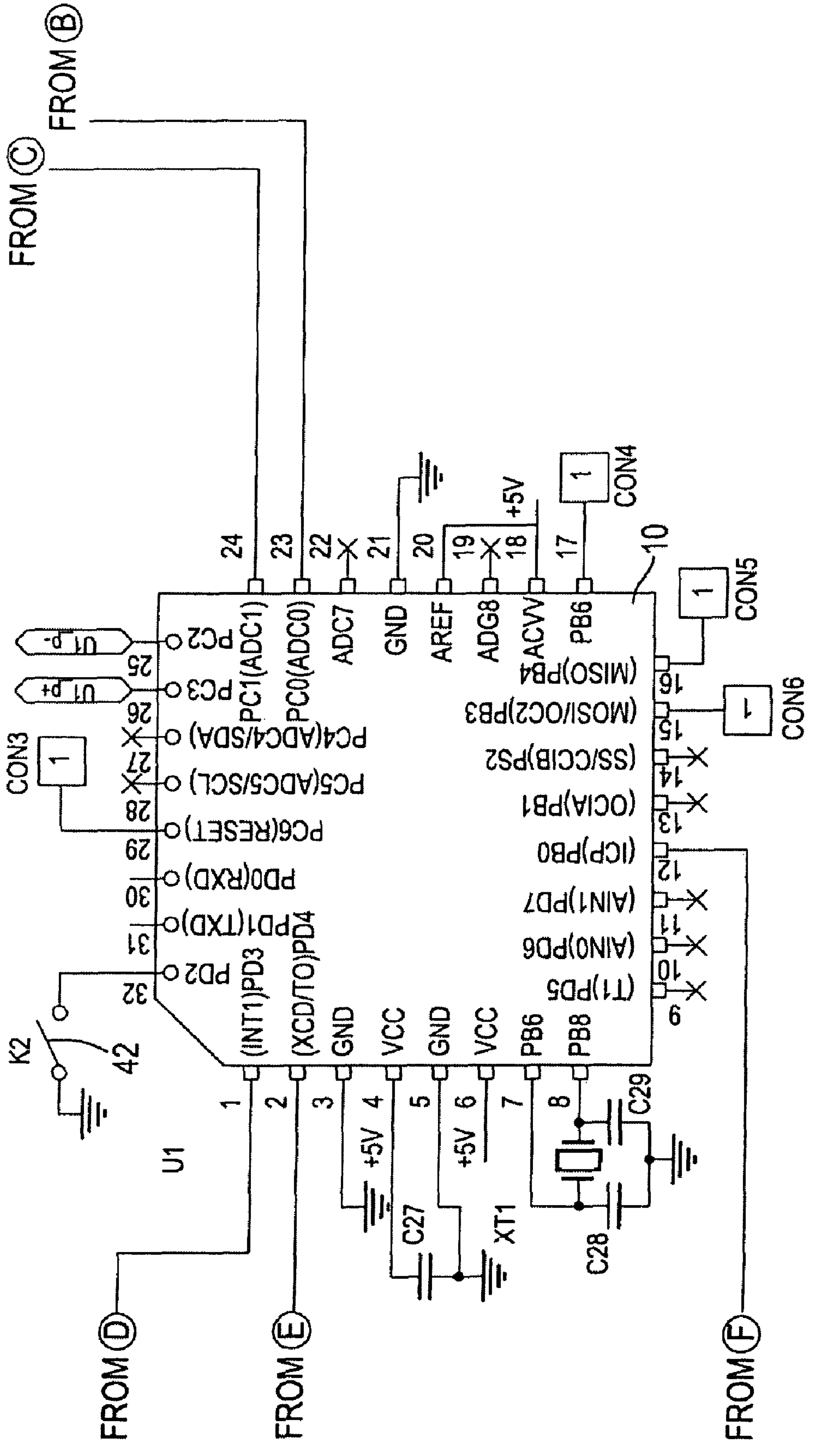
Figure 4E:
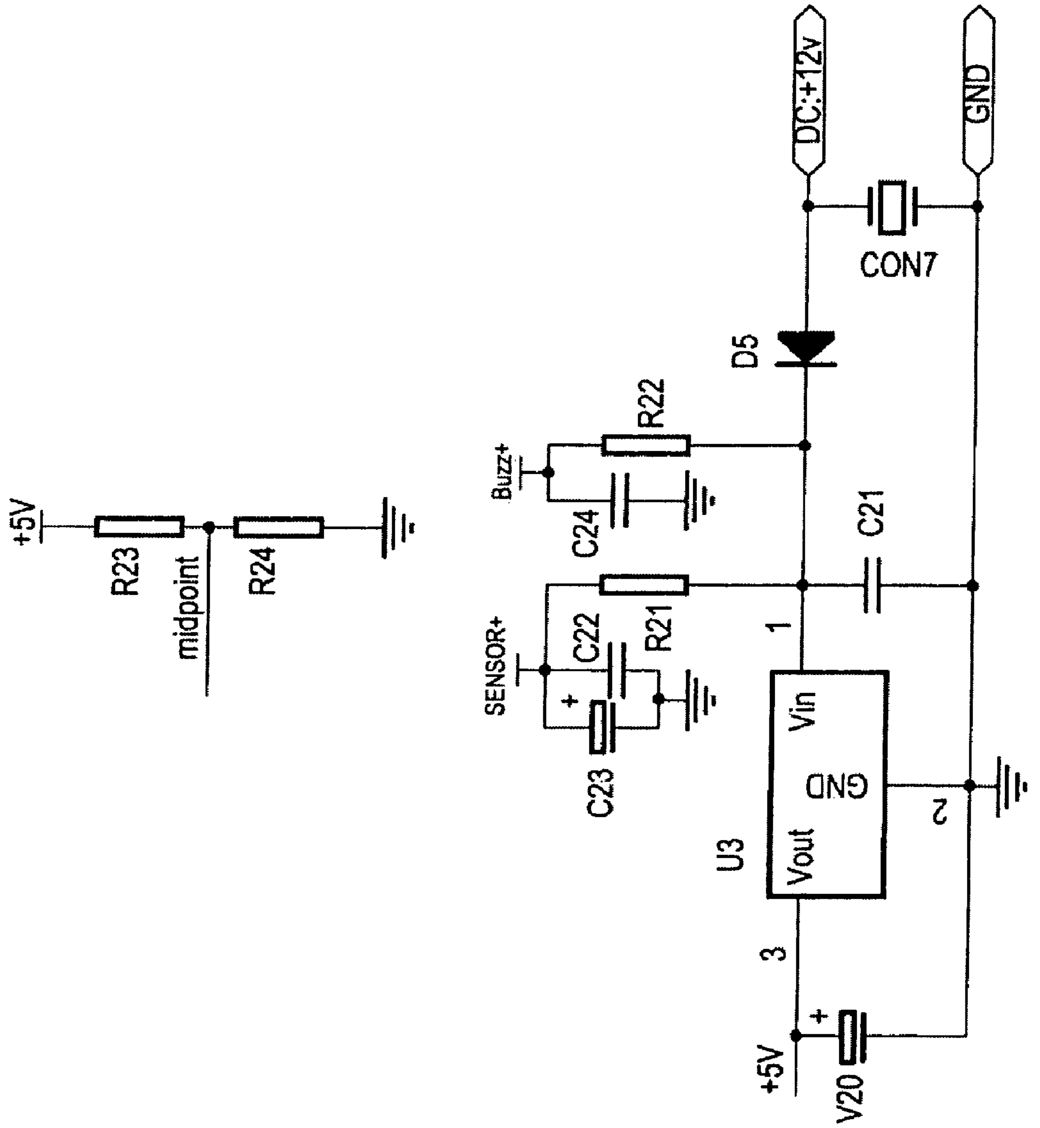

With reference to FIGS. 1 and 2, an application of the disclosed a device of the present application on a bus for detecting the closure of a vehicle door. The device includes a first ultrasonic wave sensor 1 installed on the top of door frame and a second ultrasonic wave sensor 2 mounted on an outer surface of the vehicle above the door frame. The first ultrasonic wave sensor 1 detects whether any object or passenger exists right underneath the door frame top. The second ultrasonic wave sensor 2 detects whether there is any nearby obstacle on the outer side of the door if the door is closed.

With reference to FIGS. 3 and 4A-4E, the controlling circuit includes a microprocessor 10, a signal transceiving unit 20, a return wave amplifying unit 30, a vehicle door closure determining and controlling circuit 40 and an alarm 50.

In this embodiment, the microprocessor 10 is the ATMEL AtMega8 microprocessor built in with an internal memory.

The signal transceiving unit 20 is connected with the microprocessor 10. The signal transceiving unit 20 includes a first signal transceiving circuit 22 and a second signal transceiving circuit 24 that control respectively the first ultrasonic wave sensor 1 and the second ultrasonic wave sensor 2 to emit ultrasonic wave probing signals. The reflecting signals of the ultrasonic wave probing signal are also received by the first signal transceiving circuit 22 and the second signal transceiving circuit 24.

The return wave amplifying unit 30 is connected between the signal transceiving unit 20 and the microprocessor 10. The return wave amplifying unit 30 includes a first amplifying circuit 32 and a second amplifying circuit 34. Each of the amplifying circuits 32, 34 consists a 40 KHz band pass filter 322, 342 and an amplifier 324, 344. The 40 KHz band pass filters 322, 342 are connected with the first signal transceiving circuit 22 and the second signal transceiving circuit 24, respectively, to remove noise signals with frequencies other than 40 KHz, thereby enhancing the signal-to-noise ratio of the return wave signals. The amplifiers 324, 344 can amplify weak return wave signals. The amplified return wave signals are transmitted to the microprocessor 10 for processing.

The output terminal of the vehicle door closure determining and controlling circuit 40 is connected with the input terminal of the microprocessor 10 and detects whether the door is open and outputs a signal to the microprocessor 10. The open/close action of the door is then controlled by the microprocessor 10. The vehicle door closure determining and controlling circuit 40 mainly includes an open button 42, a close button 44, and a door switch 46 connected with the microprocessor 10. The door switch 46 consists of a relay.

The alarm 50 is connected to an output terminal of the microprocessor 10 and is installed in the vicinity of the driver seat. The alarm 50 is controlled by the microprocessor 10 to send out sound or light signal to notify the driver.

Under the control of the microprocessor 10, the two ultrasonic wave sensors 1, 2 can emit ultrasonic wave signals at the frequency of 40 KHz. The emitted ultrasonic wave signals propagate at the speed of 340 m/s in the air. When the ultrasonic wave signal encounters an obstacle, part of the ultrasonic wave signal is reflected and received by the first signal transceiving circuit 22 and the second signal transceiving circuit 24. The received return wave signals are amplified by the return wave amplifying unit 30 and sent to the microprocessor 10 for processing. The microprocessor 10 converts the analog return wave signals into digital signals and performs different operations according to the door status.

Figure 5:
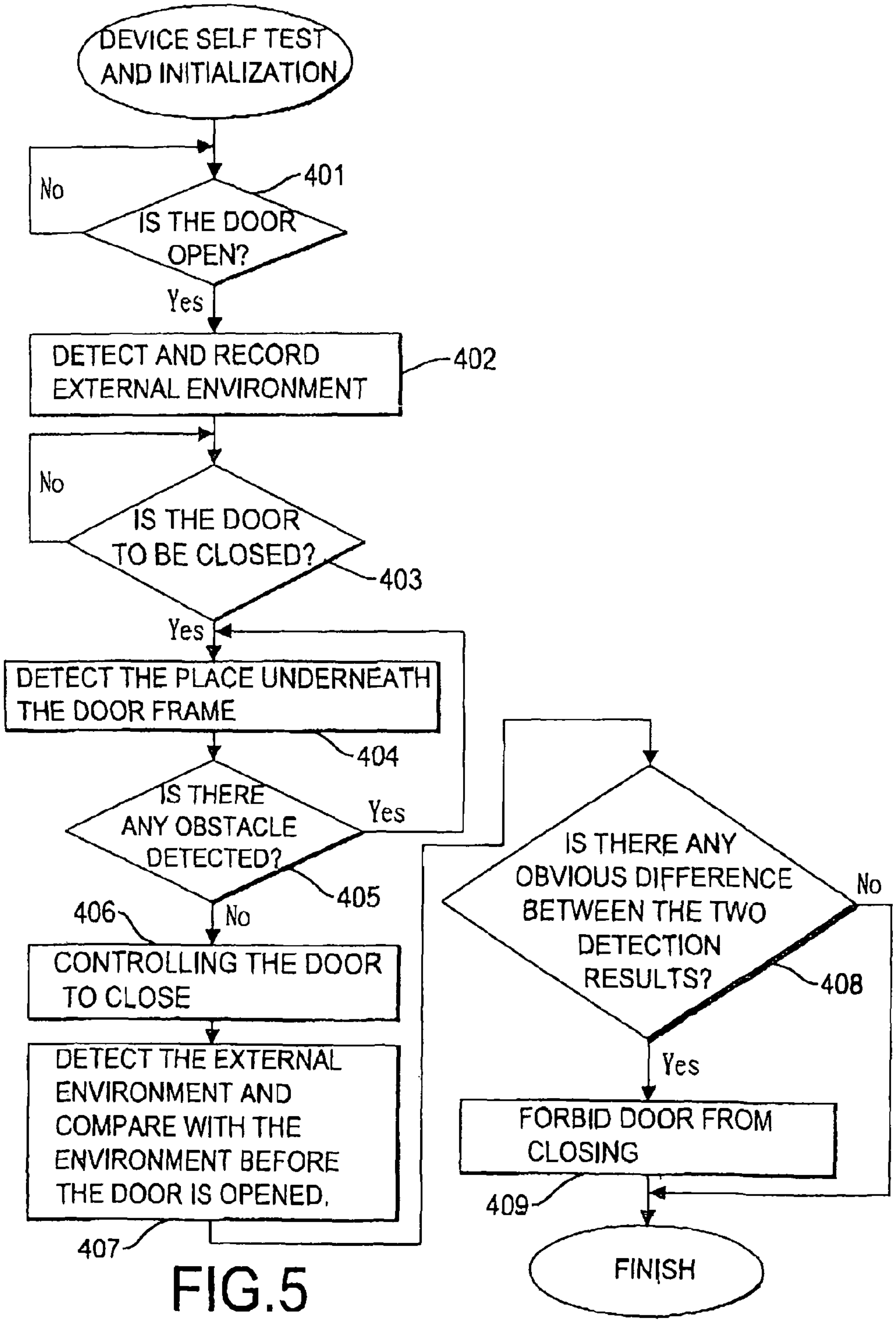
FIG. 5 is a flowchart of the disclosed method.

With reference to FIG. 5, when the driver pushes down the open button 42, the microprocessor 10 detects the opening of the door (step 401) and drives the second ultrasonic wave sensor 2 to detect the environment outside the door. The detection result is stored in its built-in memory (step 402).

When the driver pushes down the close button 44, the microprocessor 10 detects the closing of the door (step 403) and drives the first ultrasonic wave sensor 1 to scan the environment right underneath the door frame (step 404) and to determine whether there is any obstacle (step 405). If any object is detected under the door frame, the door is forbid from closing and the driver is notified by the alarm 50. On the other hand, if no object is underneath the door frame, the microprocessor 10 controls the vehicle door closure determining and controlling circuit 40 to close the door (step 406). At the same time, the second ultrasonic wave sensor 2 further scans the environment outside the door. The detection result is compared with the recorded information in the built-in memory before the door is opened (step 407). The microprocessor 10 determines whether there is any obvious difference between the two detection results (step 408). If there is then there is a possibility that something is squeezed by the door. The microprocessor 10 then drives the alarm 50 to notify the driver not to move the vehicle (step 409).

To prevent the driver from closing the door while there are still people or objects at the door, the microprocessor 10 controls the open and close of the door via the door switch 46 (relay). If the driver closes the door and the microprocessor 10 determines that it should not be closed, the microprocessor 10 outputs a signal so that the door switch 46 becomes open and it does not complete a closed circuit. Therefore, the door cannot be closed, preventing passengers from being squeezed.

The invention uses the ultrasonic wave sensors 1, 2 as the detecting devices. Unlike IR signals that propagate in straight lines, the ultrasonic waves propagate in a wedge shape. This guarantees that there is no blind region around the door area. The propagation orientation property of ultrasonic waves and the cavity shape of the ultrasonic wave probe have a close relationship. When manufacturing the ultrasonic wave probe, one can make the covering angle as large as possible in the direction parallel to the vehicle and as small as possible in the direction perpendicular to the vehicle. This ensures that objects farther from the vehicle will not trigger false alarms.

Even though numerous characteristics and advantages of the present invention have been set forth in the foregoing description, together with details of the structure and features of the invention, the disclosure is illustrative only. Changes may be made in the details, especially in matters of shape, size, and arrangement of parts within the principles of the invention to the full extent indicated by the broad general meaning of the terms in which the appended claims are expressed.

What is claimed is:

1. A method with a memory function for controlling the closure of a vehicle door mounted to a door frame, comprising the steps of:

- emitting a first detecting signal when the vehicle door is open for detecting and recording a first environmental status outside the vehicle door;
- emitting a second detecting signal when the door is to be closed for detecting whether any obstacle exists at a place directly under a door frame top, and allowing the vehicle door to be closed if the second detecting signal detects no obstacle or forbidding the vehicle door to be closed if an obstacle is detected;
- emitting a third detecting signal for detecting and recording a second environmental status outside the vehicle door when the second detecting signal indicates that the vehicle door is allowed to be closed;

and

- comparing the first environmental status outside the vehicle door as detected by the first detecting signal with the second environmental status outside the vehicle door as detected by the third detecting signal, and forbidding the door to close if they are obviously different.

2. The method of claim 1, wherein the first detecting signal, the second detecting signal, and the third detecting signal are ultrasonic wave signals.

3. The method of claim 2, wherein the second detecting signal is emitted downward and outward from a top of the door frame for detecting whether any obstacle exists on the outer side of the vehicle door.

4. The method of claim 3 further comprising the step of determining whether the vehicle door is to be closed before emitting the second detecting signal.

5. The method of claim 4, wherein an alarm is sent out when the environmental status outside the door as detected by the first detecting signal is obviously different from the environmental status outside the door as detected by the third detecting signal.

6. The method of claim 5, wherein the first detecting signal and the third detecting signal are emitted by the same sensor.

7. The method of claim 1, wherein the second detecting signal is emitted downward and outward from a top of the door frame for detecting whether any obstacle exists on the outer side of the vehicle door.

8. The method of claim 7 further comprising the step of determining whether the vehicle door is to be closed before emitting the second detecting signal.

9. The method of claim 8, wherein an alarm is sent out when the environmental status outside the door as detected by the first detecting signal is obviously different from the environmental status outside the door as detected by the third detecting signal.

10. The method of claim 9, wherein the first detecting signal and the third detecting signal are emitted by the same sensor.

11. A device with a memory function for controlling the closure of a vehicle door mounted to a door frame of a vehicle, comprising:

- a first ultrasonic wave sensor mounted on a top of the door frame for detecting the place under the first ultrasonic wave sensor;
- a second ultrasonic wave sensor mounted on an outer surface of the vehicle above the first ultrasonic wave sensor for detecting a nearby area outside the vehicle door;
- a microprocessor built in with an internal memory;
- a signal transceiving unit connected with the microprocessor for controlling the first and second ultrasonic wave sensors to emit ultrasonic signals and receiving reflected signals;
- a return wave amplifying unit connected between the signal transceiving unit and the microprocessor for amplifying the reflected signals received by the signal transceiving unit and sending the amplified signals to the microprocessor for processing;

and

- a vehicle door closure determining and controlling circuit connected with the microprocessor for detecting whether the vehicle door is open or closed and outputting a corresponding signal to the microprocessor, thereby determining the opening and closing of the vehicle door through the control of the microprocessor;
- wherein the first ultrasonic wave sensor is controlled by the microprocessor to emit a first detecting signal for detecting and recording the environmental status outside the door when the door is open;
- the second ultrasonic wave sensor emits a second detecting signal for detecting the existence of any obstacle underneath the door frame top when the door is to be closed;
- the first ultrasonic wave sensor emits a third detecting signal for detecting and recording the environmental status outside the door when the second detecting signal indicates that the vehicle door is allowed to be closed;
- the microprocessor compares the environmental status outside the door as detected by the first detecting signal with the environmental status outside the door as detected by the third detecting signal, and
- the door is forbidden from being closed if they are obviously different.

12. The device of claim 11 further comprising an alarm connected with the microprocessor for sending out an alarm signal under the control of the microprocessor.

13. The device of claim 12, wherein the signal transceiving unit includes:

- a first signal transceiving circuit, which is connected to drive the first ultrasonic wave sensor to emit ultrasonic wave signals and to receive the return wave signals thereof; and
- a second signal transceiving circuit, which is connected to drive the second ultrasonic wave sensor to emit ultrasonic wave signals and to receive the return wave signals thereof.

14. The device of claim 13, wherein the vehicle door closure determining and controlling circuit includes an open button, a close button, and a door switch connected with the microprocessor.

15. The device of claim 14, wherein the door switch is a relay.

16. The device of claim 15, wherein the return wave amplifying unit includes:

- a first amplifying circuit composed of a band pass filter and an amplifier connected in series, with the band pass filter connected with the first signal transceiving circuit; and
- a second amplifying circuit composed of a band pass filter and an amplifier connected in series, with the band pass filter connected with the second signal transceiving circuit.

* * * * *

UNITED STATES PATENT AND TRADEMARK OFFICE

CERTIFICATE OF CORRECTION

PATENT NO. : 8,032,285 B2
APPLICATION NO. : 11/948776
DATED : October 4, 2011
INVENTOR(S) : Shih-Hsiung Li It is certified that error appears in the above-identified patent and that said Letters Patent is hereby corrected as shown below:

On the Title Page, Item (54) and in the Specification, Column 1, lines 1-3, please correct the title from "DEVICE WITH MEMORY FUNCTION FOR CONTROLLING CLOSURE OF VEHICLE AND METHOD THEREOF" to --DEVICE WITH MEMORY FUNCTION FOR CONTROLLING CLOSURE OF VEHICLE DOORS AND METHOD THEREOF--

Signed and Sealed this
Eighteenth Day of March, 2014

Michelle K. Lee
*Deputy Director of the United States Patent and Trademark Office*